(12) United States Patent
Tamai et al.

(10) Patent No.: US 6,946,755 B2
(45) Date of Patent: Sep. 20, 2005

(54) LINEAR MOTOR

(75) Inventors: Masafumi Tamai, Fukuoka (JP);
Ryuichirou Tominaga, Fukuoka (JP);
Fumihiro Tara, Fukuoka (JP);
Yoshiaki Kubota, Fukuoka (JP); Takao Fujii, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/432,506

(22) PCT Filed: Nov. 19, 2001

(86) PCT No.: PCT/JP01/10109

§ 371 (c)(1),
(2), (4) Date: May 21, 2003

(87) PCT Pub. No.: WO02/43228

PCT Pub. Date: May 30, 2002

(65) Prior Publication Data

US 2004/0032170 A1 Feb. 19, 2004

(30) Foreign Application Priority Data

Nov. 21, 2000 (JP) ........................................ 2000-354010
Aug. 20, 2001 (JP) ........................................ 2001-248901

(51) Int. Cl.[7] .............................................. H02K 41/02
(52) U.S. Cl. ........................................................ 310/12
(58) Field of Search .......................................... 310/12

(56) References Cited

U.S. PATENT DOCUMENTS 5,773,941 A * 6/1998 Moritz et al. ............... 318/254
5,920,164 A * 7/1999 Moritz et al. ............... 318/254
6,005,310 A * 12/1999 Mosciatti et al. ............ 310/12
6,269,854 B1 * 8/2001 Matsuo et al. ............ 152/152.1
6,339,629 B1 * 1/2002 Takeuchi et al. ............ 376/254
6,528,907 B2 * 3/2003 Hwang et al. ................ 310/12

FOREIGN PATENT DOCUMENTS

| DE | 28 51 569 A1 | * | 6/1980 | .......... H02K/41/02 |
| JP | 60-73383 | * | 5/1985 | ......... H02K/41/025 |
| JP | 60-162983 | * | 10/1985 | .......... H02K/41/02 |
| JP | 406034284 A1 | * | 2/1992 | .......... F28D/15/02 |
| JP | 2000-228860 A | * | 8/2000 | .......... H02K/41/02 |
| JP | 2001-268851 | * | 9/2001 | ............ H02K/9/22 |

OTHER PUBLICATIONS

English language translation of DE 28 51 569 A1.*

* cited by examiner

Primary Examiner—Darren Schuberg
Assistant Examiner—Judson H. Jones
(74) Attorney, Agent, or Firm—Sughrue Mion, PLLC

(57) ABSTRACT

A small and high rigid linear motor (1), wherein a tabular heat pipe (7) is disposed between a plurality of coil rows forming an armature coil (6) along the longitudinal direction of an armature (5) with a part of the heat absorbing part of the heat pipe (7) fixed to the armature coil (6) and the heat radiating part thereof inserted into a refrigerant passage (11), a block-shaped locking member (8) for fixing the heat pipe (7) to a frame (10) is installed between the portion of the heat pipe (7) for fixing the armature coil thereto and the portion thereof inserted into the refrigerant passage (11), and a hollow recessed part (10a) forming the refrigerant passage (11) and allowing die insertion of the heat radiating part of the heat pipe (7) therein and a locking step part (10c) allowing the locking of the frame (10) to the locking member (8) installed on the heat pipe are provided in the frame (10), whereby the heat of the armature coil can be efficiently transferred to the frame, and the thrust of a rotor can be prevented from lowering according to a rise of temperature of the armature coil.

10 Claims, 8 Drawing Sheets

LINEAR MOTOR

TECHNICAL FIELD

The present invention relates to a linear motor that can prevent the thrust of a rotor from decreasing in accordance with a rise in temperature of an armature coil by efficiently transferring the heat of the armature coil to a frame without undergoing thermal deformation and that has a small size, high rigidity, and high reliability.

BACKGROUND ART

Conventionally, a linear motor is used for a system required to have ultraprecise positioning/high thrust, such as a conveyance system typified by that of tooling equipment or that of semiconductor-fabrication equipment. An armature that is a constituent element of the linear motor is classified roughly into a coreless type having no core and a core type having a core.

The coreless type linear motor of these is structured as shown in FIG. 1. FIG. 1 is a perspective view of the whole of the coreless type linear motor used conventionally, which is identical in the general structure to the present invention described later. FIG. 5 is a view showing a cooling structure of a coreless type linear motor according to a first conventional technique, which corresponds to a front sectional view along line A—A of FIG. 1. The linear motor used in this example is of a moving-coil type in which an armature serves as a rotor, and a permanent magnet for a field system disposed between magnetic air gaps on both sides of the armature serves as a stator, and the linear motor has a magnetic-flux penetration structure.

In the figures, 1 is the linear motor, 2 is a field yoke, 3 is the permanent magnet, 4 is a yoke base, 5 is the armature, 6 is an armature coil, 9 is a resin mold, 13 is a winding-fixing frame, 14 is a frame, and 15 is a refrigerant passage.

In the linear motor 1, a plurality of permanent magnets 3 that form field poles are linearly arranged on the side faces of the two-line field yokes 2 so that the polarities of the N and S poles alternately form, and the yoke base 4 is disposed between the field yokes 2, thus forming a stator. Further, in the linear motor 1, the armature 5 is disposed in parallel with the linearly arrayed permanent magnets 3 with a magnetic air gap between the armature and the permanent magnets. The armature 5 has two lines of coreless type armature coils 6 formed by tabularly molding a plurality of coil groups, and the armature coils 6 are linearly arranged on both sides of a winding-fixing frame 13 made of metal, such as stainless steel, and the winding-fixing frame 13 and the armature coils 6 are bonded together with a resin mold 9.

Further, a cross-sectionally T-shaped frame 14 used to fix the armature 5 and made of metal, such as stainless steel, is provided on the upper part of the armature 5 along its longitudinal direction. After an end of the winding-fixing frame 13 is inserted into a recessed part 14a of the frame 14, the armature 5 and the frame 14 are bonded together by brazing, welding, or gluing. A refrigerant passage 15 to which a refrigerant is supplied from a refrigerant supplying device, not shown, is provided in the interior of the frame 14. A linear guide made up of a slider and a guide-rail, not shown, is attached to each of the rotor and stator sides of the linear motor, whereby the rotor can be moved linearly with respect to the stator.

In this structure, when an electric current is applied to the armature coil 6 of each phase from a power source not shown, an electromagnetic force works in the longitudinal direction of the armature coil 6 from a magnetic field produced in the magnetic air gap between the armature coil 6 and the permanent magnets 3 by an electromagnetic action thereof with the permanent magnets 3, and a thrust is generated, thereby performing a smooth linear movement. When a driving current to drive the rotor flows through the armature coil 6 at this juncture, the armature coil 6 generates heat because of internal resistance, but the heat generated by the armature coil 6 is transferred to the frame 14 through the resin mold 9 and the winding-fixing frame 13, and a heat exchange is performed by a refrigerant circulating through the interior of the refrigerant passage 15, and the whole of the armature 5 is cooled.

In contrast with the coreless type linear motor mentioned above, a core type linear motor is structured as in FIG. 11. FIG. 11 is a front sectional view of the core type linear motor according to a second conventional technique. In this example, a description will be given of a moving coil type linear motor that uses an armature as a rotor, in relation to the second conventional technique and the present invention described later.

In FIG. 11, 21 is a fixed base, and 22 is a linear guide that is made up of guide rails 22A provided at right and left ends on the fixed base 21 and sliders 22B corresponding to the guide rails 22A, respectively. 23 is a linear motor, 24 is a stator, 25 is a rotor, 26 are tabular field yokes, each facing the fixed base 1 and fixed thereto, and 27 is a plurality of permanent magnets arranged along the field yoke 26 (i.e., vertically with respect to the page surface) so that alternately different polarities form. The stator 24 is formed by field poles produced by the field yokes 26 and the permanent magnets 27. 28 is a core that faces the permanent magnets 7 with a magnetic air gap between the core and the magnets and that is formed by laminating electromagnetic steel sheets in the height direction of the permanent magnet 7, and 29 is a coil wound in the interior of a slot 8A of the core 28 and fixed with a resin mold not shown. The rotor 25 is formed by an armature made up of the core 28 and the coil 29. 30 is a table used to mount a load. When the core 28 is fixed to the table 30, a fixing bolt 31 is passed through a through hole 28B made in the core 28, and then the fixing bolt 31 is screwed into a female screw part 30C made in the table 30, whereby the core 28 and the table 30 are fastened together.

Since the linear motor 23 has a structure in which each permanent magnet 27 is disposed as if to squeeze both sides of the coil 29, and the lines of magnetic force of the permanent magnets 27 penetrate through the coil 29, i.e., the linear motor 23 has a so-called magnetic-flux penetration structure, a sidewise force is not applied to the table 30 without generating an attraction force between the permanent magnets 27 and the coil 29.

However, the coreless type linear motor according to the first conventional technique has the following unresolved problems.

(1) The thermal conductivity of the resin mold 9 with which the surroundings of the coil group are covered and the thermal conductivity of the winding-fixing frame 13 that holds the armature coil 6 are much smaller than that of the armature coil 6. Additionally, since the contact area of the winding-fixing frame 13 with the frame 14 is small, and the winding-fixing frame 13 is not in direct contact with the refrigerant passage 15, the thermal resistance of a path from the armature coil 6 to the refrigerant passage 15 is large on the whole. That is, since the cooling capacity of the linear motor depends on the thermal resistance from the armature coil 6 to the refrigerant passage 15, measures to cause a refrigerant to merely flow toward the frame 14 have a limit, and heat caused by a rise in temperature of the armature coil 6 could not be efficiently radiated.

(2) If heat caused by a rise in temperature of the armature coil 6 cannot be efficiently radiated to the frame 14 as mentioned above, the internal resistance of the armature coil 6 increases, and a driving current decreases in correspondence with the temperature rise of the armature coil 6. In this situation, a decrease in the driving current has brought about a significant decrease in the thrust of the rotor of the linear motor 1 because the thrust of the rotor of the linear motor 1 is proportional to the driving current.

(3) Generally, if the temperature of the armature coil 6 rises high as mentioned above, the resin mold 9 covering the armature coil 6 undergoes thermal deformation in correspondence with the temperature rise caused by the heat generation of the armature coil 6, whereas the frame 14 through the interior of which a refrigerant flows is small in a rise in temperature and does not undergo thermal deformation. Therefore, there has been a concern that a distortion will occur between the resin mold 9 and the frame 14, and the resin mold 9 weak in strength will be damaged. Additionally, in a situation where the linear motor is used as a stepper driving mechanism of, for example, semiconductor-fabrication equipment operated in a vacuum environment, if the temperature of the resin mold 9 rises because of the heat generation of the armature coil 6, gas is emitted from the surface of the resin mold 9, and the vacuum environment needed for a manufacturing process is contaminated, and, as a result, little reliability has been placed on the cooling system of the linear motor.

(4) Additionally, under the method of inserting an end of the winding-fixing frame 13 into the recessed part 14a of the frame 14 and fixing them together, a length by which the winding-fixing frame 13 is inserted into the frame 14 is short as shown in FIG. 5, and therefore an unsolved problem exists in the fact that the unified structure of the armature 5 and the frame 14 lowers the rigidity of the rotor. As a result, when the rotor was run, the rotor generates vibrations toward the stator facing the rotor with a magnetic air gap therebetween, thus lowering the movement precision.

(5) Additionally, as another conventional technique, a proposal has been made of a linear motor, not shown, structured to dispose a plurality of heat sinks used to flow a refrigerant between adjoining coils formed in the same armature coil row, but, since the heat sinks are externally situated outside the winding-fixing frame fixing the armature coil, the whole of the armature becomes large in size, and the number of assembly steps increases so as to make a size reduction not possible if they are covered with a resin mold.

The core type linear motor according to the second conventional technique also has the following unsolved problems.

(1) In the moving coil type linear motor 23 shown in the figure, if a driving current continues to be supplied from a power source, not shown, to the coil 29 in order to raise the thrust of the motor, the temperature rises in correspondence with an increase in the internal resistance of the coil 29, and the heat value increases. Therefore, disadvantageously, the heat emitted from the coil 29 is transferred to the table 30 fixed to the upper part of the core 28 through the core 28, and the core 28 and the table 30 undergo thermal deformation. Especially, in a part facing the fixed base 21 of the core 28, a warp in the longitudinal direction caused by the thermal deformation becomes larger proportionately with a rise in temperature of the coil 29 with the lapse of time.

Not only the moving coil type linear motor but also a moving magnet type linear motor, not shown, that uses field poles as rotors has the following common problems.

(2) If the coil 29 of the linear motor 23 greatly generates heat, the core 28 is correspondingly greatly deformed in the direction facing the arrayed permanent magnets 2, and a magnetic air gap between the coil 29 and the permanent magnets 27 often varies, thus generating a cogging thrust. As a result, the driving performance of the linear motor 23 has deteriorated proportionately with an increase in the cogging thrust, and a great influence has been exerted especially on the processing precision.

(3) On the other hand, thermal deformation caused by transferring the heat to the table 30 exerts a bad influence on the slider 22B attached to the table 30 or on a scale used for a linear encoder not shown, so that an error in positioning accuracy occurs, and it has been difficult to achieve highly accurate positioning.

(4) In the linear motor 23, a resin mold (not shown) covering the coil 29 undergoes thermal deformation through the influence of a rise in temperature of the coil 29, and thereby the resin mold has been damaged.

(5) If the resin mold is broken, for example, when the linear motor 23 is used in a vacuum environment, the amount of dust caused by gas emitted from the surface of the resin mold will increase, and the vacuum environment will be impaired, whereby little reliability has been placed on the linear motor 23.

The present invention has been made to solve the aforementioned problems, and it is a first object thereof to provide a linear motor, which is of a coreless type, capable of preventing the thrust of a rotor from decreasing in accordance with a rise in temperature of an armature coil by efficiently transferring the heat of the armature coil to a frame, the linear motor having a small size, high rigidity, and high reliability.

It is a second object of the present invention to provide a linear motor, which is of a core type, having high accuracy and high reliability by keeping a core and a table from undergoing thermal deformation.

DISCLOSURE OF INVENTION

In order to solve the aforementioned problems, the present invention as set forth in claim 1 is characterized in that a linear motor has a field yoke in which a plurality of permanent magnets that form field poles so that alternately different polarities form are linearly arranged, an armature facing a magnet array of the permanent magnets in parallel therewith with a magnetic air gap between the armature and the magnet array, and a frame that fixes the armature and has a heat sink, the field poles and the armature relatively running while using one of the field poles and the armature as a stator and using the other one as a rotor, wherein the permanent magnets and the field yoke that constitute the field poles are arranged in two-line form, the armature is disposed between the two-line field poles and has armature coils in at least two-row form by tabularly arranging a plurality of coil groups in a longitudinal direction thereof, a tabular heat pipe is disposed between the plurality of coil groups along a longitudinal direction of the armature and is bonded with a resin mold so as to cover the plurality of coil groups, and a part of a heat absorbing part of the heat pipe is fixed to the armature coil, a heat radiating part of the heat pipe being inserted into an interior of the heat sink.

The present invention as set forth in claim 2 is characterized in that, in the linear motor as set forth in claim 1, a block-shaped locking member to be fixed to the frame is provided between a part of the heat pipe to which the armature coil is fixed and a part thereof to be inserted into the interior of the heat sink.

The present invention as set forth in claim 3 is characterized in that, in the linear motor as set forth in claim 1 or 2, the frame has a hollow recessed part that is a constituent element of the heat sink and is used to insert the heat radiating part of the heat pipe into an interior thereof, and a locking step part that is formed on a side of an opening of the recessed part and has a step designed so that it can be engaged with the locking member.

The present invention as set forth in claim 4 is characterized in that, in the linear motor as set forth in any one of claims 1 through 3, the heat sink is formed as a refrigerant passage in which a heat exchange is performed with a refrigerant.

The present invention as set forth in claim 5 is characterized in that, in the linear motor as set forth in any one of claims 1 to 4, the heat pipe has a hollow thin tube filled with an operating fluid bent parallelly in an interior of a thin plate member.

The present invention as set forth in claim 6 is characterized in that, in the linear motor as set forth in any one of claims 1 through 5, a material of the heat pipe is stainless steel.

The present invention as set forth in claim 7 is characterized in that, in the linear motor as set forth in any one of claims 1 through 6, the heat radiating part of the heat pipe is provided with a heat radiating fin.

The present invention as set forth in claim 8 is characterized in that a linear motor has a field pole in which a plurality of permanent magnets with alternately different magnetic poles are disposed along a field yoke, and an armature which faces the field pole with a magnetic air gap between the armature and the field pole and in which a plurality of coils are wound around a core having a slot, one of the field poles and the armature being used as a stator, the other one being used as a rotor, the rotor being relatively moved in a longitudinal direction of the stator, and, in the linear motor, the rotor is provided with a table to mount a load, a cooling unit that has a refrigerant passage to circulate a refrigerant in its interior is provided between the rotor and the table, the rotor is provided with a thin sheet-like heat pipe on a plane in a direction perpendicular to a plane facing the stator with a magnetic air gap between the stator and the plane facing the stator, and a heat receiving part of the sheet-like heat pipe is brought into contact with a surface of the rotor, whereas a part of a heat radiating part is brought into contact with the cooling unit.

The present invention as set forth in claim 9 is characterized in that, in the linear motor as set forth in claim 8, the sheet-like heat pipe has a structure in which a plurality of meandering hollow thin tubes are arranged.

The present invention as set forth in claim 10 is characterized in that, in the linear motor as set forth in claim 8 or 9, the sheet-like heat pipe is bonded to a surface of the rotor with a resin mold.

The present invention as set forth in claim 11 is characterized in that, in the linear motor as set forth in any one of claims 8 through 10, the cooling unit is attached by use of a fixing bolt so that the cooling unit can be freely detached from the rotor or the table.

BEST MODE FOR CARRYING OUT THE INVENTION

Embodiments of the present invention will be described with reference to the drawings.

First Embodiment

Figure 1:
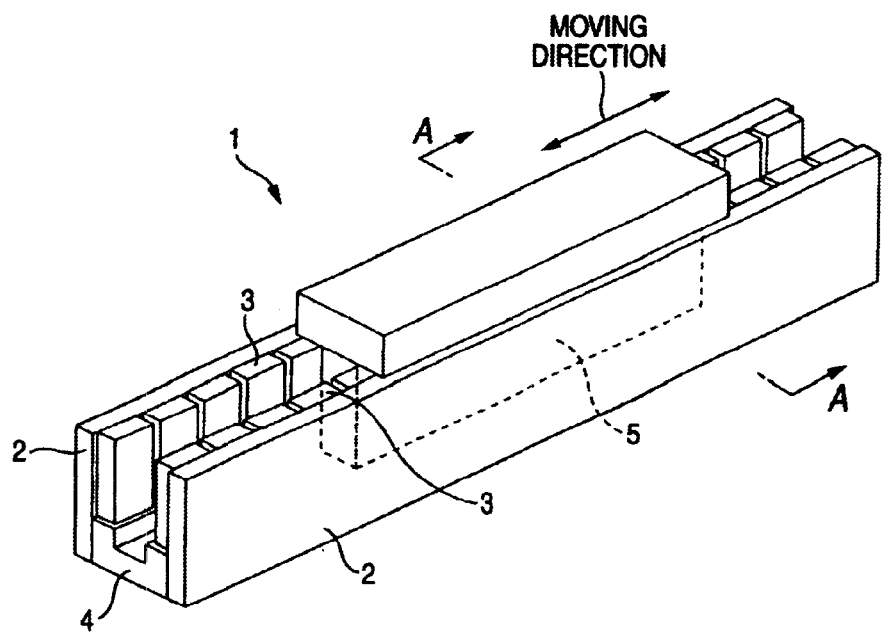
FIG. 1 is a perspective view of the whole of a coreless type linear motor generally used, showing a whole structure common to both the present invention and a first conventional technique.
Figure 2:
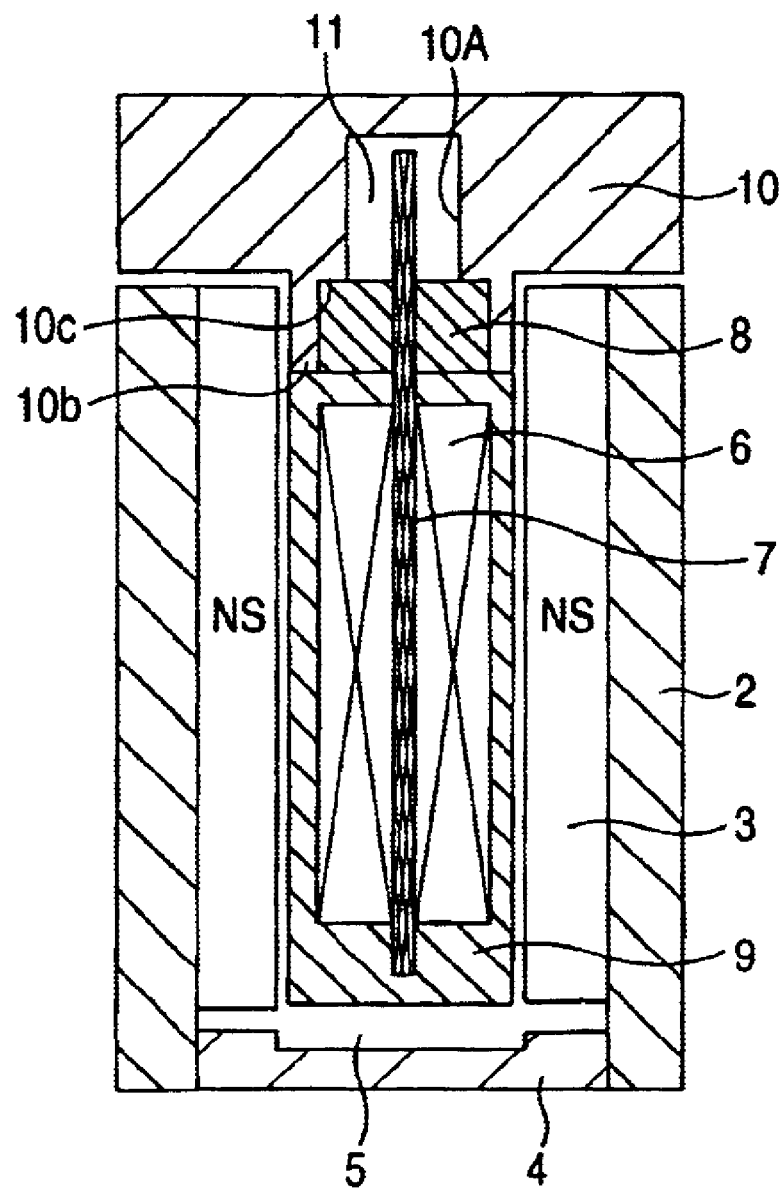
FIG. 2 shows a linear motor according to a first embodiment of the present invention, being a front sectional view along line A—A taken when the linear motor is seen from the direction of thrust.

FIG. 2 shows a linear motor according to a first embodiment of the present invention, being a front sectional view along line A—A taken when the linear motor of FIG. 1 is seen from the direction of thrust. In the present invention, the same reference characters as in the conventional technique are given to the same constituent elements, and a description thereof is omitted. Only differences will be described. As in the conventional technique, this embodiment shows an example of a linear motor having a magnetic-flux penetration structure.

In this figure, 7 is a heat pipe, 8 is a locking member, 10 is a frame, 10a is a recessed part, 10b is a locking end wall, 10c is a locking step part, and 11 is a heat sink, which is, in this embodiment, a refrigerant passage in which a heat exchange is performed with a refrigerant.

The present invention is different from the conventional technique in the following respects.

One difference is the fact that the tabular heat pipe 7 is disposed between a plurality of coil rows that constitute the armature coil 6 along a longitudinal direction of the armature 5 and is bonded with a resin mold 9 so as to cover the coil rows. In greater detail, a part of a heat absorbing part of the heat pipe 7 is bonded to the armature coil 6, and a heat radiating part thereof is inserted in the interior of the refrigerant passage 11.

Another difference is the fact that a block-shaped locking member 8 to be fixed to the frame 10 is provided between a part of the heat pipe 7 to which the armature coil is fixed and a part thereof to be inserted in the interior of the refrigerant passage 11.

Still another difference is the fact that the frame 10 is a constituent element of the refrigerant passage 11 and has a hollow recessed part 10a used to insert the heat radiating part of the heat pipe 7 into the interior and a locking step part 10C which is formed on the side of an opening of the recessed part 10a and which has a step enabling an engagement with the locking member 8 attached to the heat pipe 7.

Figure 3:
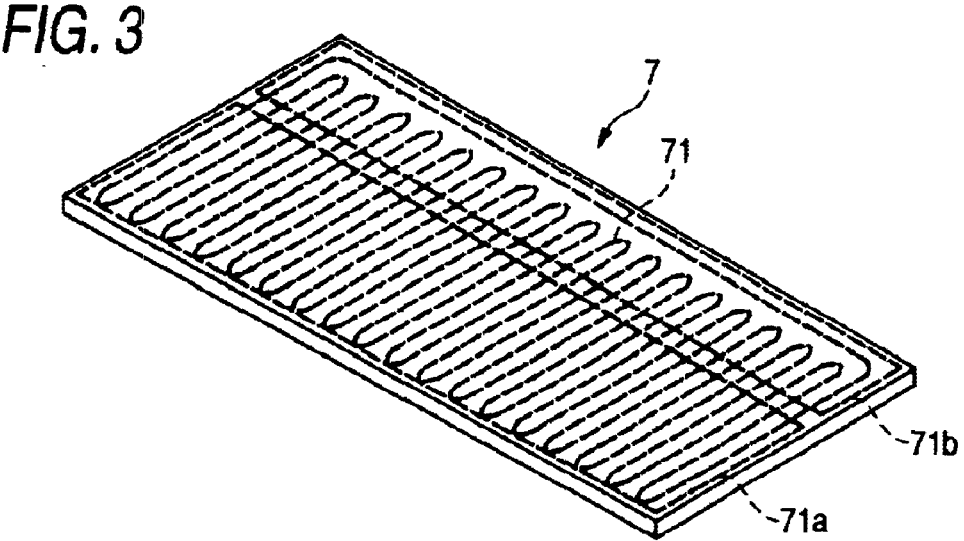
FIG. 3 is an enlarged perspective see-through view of a heat pipe.

FIG. 3 is an enlarged perspective see-through view of the heat pipe.

In FIG. 3, 71 is a thin tube, 71a is a heat absorbing part, and 71b is a heat radiating part. As shown in the figure, the heat pipe 7 is constructed such that the hollow thin tube 71 meanders as if to make an array of tubes in the interior of a thin plate member made of metal superior in heat conduction. The thin tube 71 is filled with a two-phase operating fluid, such as chlorofluorocarbon, that consists of a liquid phase operating fluid and a vapor phase operating fluid. It is provided with a heat absorbing part 71a and a heat radiating part 71b.

Next, a description will be given of an assembly of the armature and the frame that constitute the linear motor.

Figure 4:
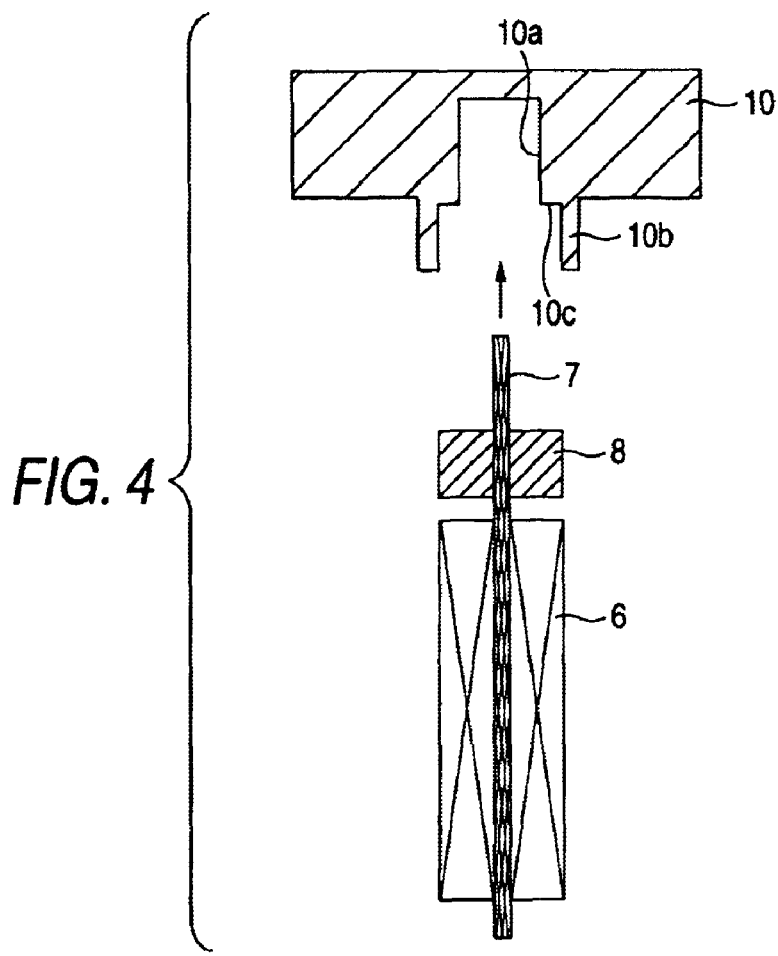
FIG. 4 is an explanatory drawing for explaining an assembly process of an armature and a frame that constitute the linear motor of FIG. 2.
Figure 5:
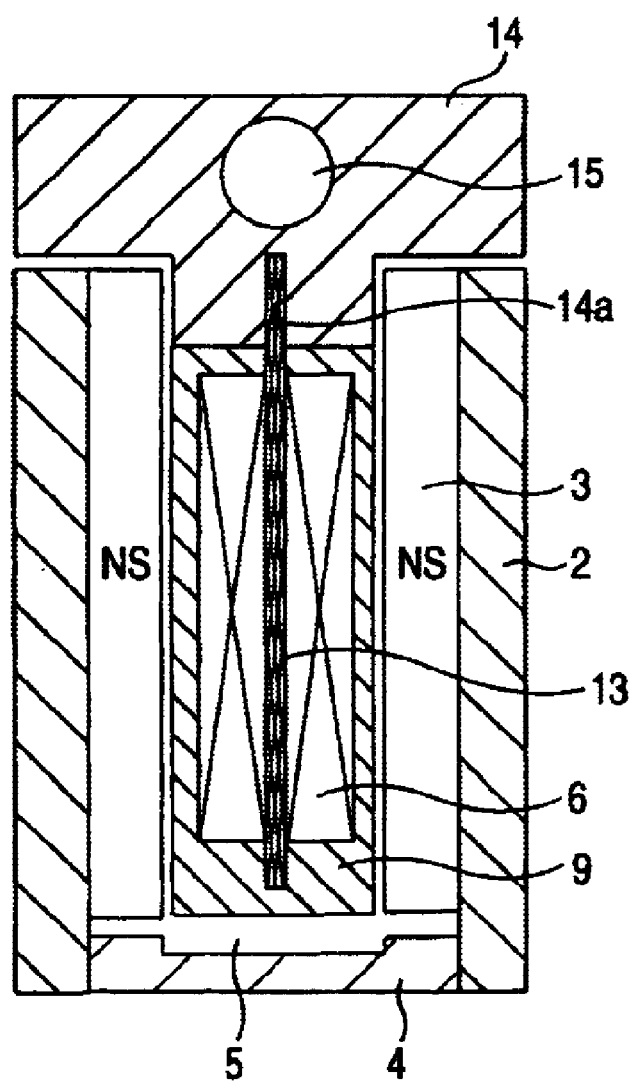
FIG. 5 shows a cooling structure of the linear motor according to the first conventional technique, corresponding to the front sectional view along line A—A of FIG. 1.

FIG. 4 is an explanatory drawing that shows the assembly process of the armature and the frame that constitute the linear motor of FIG. 2. When the armature 5 and the frame 10 are fixed together, the armature coil 6 is first bonded to the heat absorbing part of the heat pipe 7. Thereafter, the locking member 8 is fixed to the upper end part of the heat pipe 7, to which the armature coil 6 is fixed, by welding, brazing, or gluing. Thereafter, the front end part of the heat pipe 7 is inserted into the recessed part 10a of the frame 10, the locking member 8 fixed to the heat pipe 7 is then brought into contact with the locking step part 10c of the frame 10, and the armature 5 and the frame 10 are fixed and unified by bonding the end of the locking end wall 10b of the frame 10 and the end of the locking member 8 together by welding, brazing, or gluing.

Next, the operation of the linear motor will be described.

When a driving current is passed through the armature coil 6 of the linear motor, the armature coil 6 generates heat because of internal resistance. The heat generated by the armature coil 6 is transferred to the heat absorbing part of the heat pipe 7, and, when the heat absorbing part absorbs the heat, intense nucleate boiling occurs. Pressure waves changed into oscillatory waves by the intermission of the nucleate boiling cause the operating fluid, with which the meandering thin tube 71 is filled, to vibrate, and a large amount of heat is transferred to the heat radiating part because of the vibrations of the operating fluid. The heat that has reached the heat radiating part of the heat pipe 7 is transferred to the refrigerant passage 11. As a result, the heat generated by the armature coil 6 is efficiently subjected to a heat exchange by the refrigerant passage 11, and the temperature of the armature coil 6 is restrained from rising.

Next, a calculation will be performed as to the cooling capacity of the linear motor in this embodiment. The thermal conductivity of the heat pipe 7 in a heat transfer direction is about 2000 W/m·° C. or more. This means that heat can be transferred, for example, more than ten times as much as a conventional winding-fixing frame whose material is aluminum (thermal conductivity=about 200 W/m·° C.) and more than one thousand times as much as the resin mold 9 (thermal conductivity=about 2 W/m·° C.). Therefore, heat can be efficiently taken even from around an end of the armature coil 6 having high thermal resistance, and a rise in temperature of the armature coil 6 or the resin mold 9 in this embodiment can be reduced to at least one tenth of that in the conventional technique.

Therefore, heat generated by the armature coil 6 can be efficiently radiated to the refrigerant passage 11, and the rise in temperature of the armature coil 6 can be greatly reduced because of the structure in which the tabular heat pipe 7 is disposed between the plurality of coil rows that constitute the armature coil 6 along a longitudinal direction of the armature 5 and is bonded with the resin mold 9 so as to cover the coil rows, and, in addition, a part of the heat absorbing part of the heat pipe 7 is bonded to the armature coil 6, and the heat radiating part thereof is inserted in the interior of the refrigerant passage 11.

Additionally, since the heat generated by the armature coil 6 can be efficiently dissipated, the thrust of the rotor can be raised without reducing a driving current. As a result, the resin mold 9 covering the armature coil 6 can be prevented from being broken by thermal deformation caused by the influence of the rise in temperature of the armature coil 6. Additionally, since gas can be prevented from coming out from the surface of the resin mold 9 even when the linear motor is used in a vacuum environment, a linear motor with high reliability can be provided.

Additionally, the armature 5 and the frame 10 can be easily unified by using the locking member 8 and the locking step part 10c, and the rigidity of the rotor itself can be raised because of the structure in which the block-shaped locking member 8 to be fixed to the frame 10 is provided between a part of the heat pipe 7 to which the armature coil 6 is fixed and a part thereof to be inserted in the interior of the refrigerant passage 11, and, in addition, the frame 10 has the hollow recessed part 10a used to insert the heat radiating part of the heat pipe 7 into the interior and the locking step part 10C which is formed on the side of the opening of the recessed part 10a and which has a step enabling an engagement with the locking member 8 attached to the heat pipe. As a result, it becomes possible to overcome the problem of allowing the rotor to generate vibrations toward the stators that face both sides, respectively, of the rotor with magnetic air gaps therebetween when the rotor is run, and becomes possible to improve its movement precision.

Additionally, it is possible to provide a small-sized linear motor capable of being light-weight without lowering its strength and capable of lessening the number of assembling steps while maintaining the shape size of the conventional winding-fixing frame, because the heat pipe 7 is constructed such that the hollow thin tube 71 having the heat absorbing part and the heat radiating part meanders as if to make an array of tubes in the interior of the thin plate member made of metal superior in heat conduction.

Although a description has been given of the moving coil type structure in which the armature of the linear motor is used as a rotor whereas the field pole is used as a stator in this embodiment, it is permissible to employ a moving magnet type structure in which the armature of the linear motor is used as a stator whereas the field pole is used as a rotor.

Additionally, although a description has been given of the example in which the coil row of the armature coil is in two-row form, the coil row may be in at least three-row form. A combination of the number of rows of the coil row and the number of phases is not limited to a specific one.

Additionally, it is permissible to use a metallic element, such as stainless steel or aluminum, as a material of the heat pipe 7. If stainless steel is used for the heat pipe 7, it is possible to reduce an eddy current of a metallic part of the heat pipe 7 that occurs when the armature of the linear motor is moved in a thrust direction between the arrays of the permanent magnets 3, and it is possible to reduce the viscous resistance of the rotor caused by the occurrence of the eddy current.

Additionally, although an example has been shown in which the heat pipe 7 has cooling characteristics and uses a nucleate boiling phenomenon by filling the meandering thin tube 71 with a liquid phase operating fluid and a vapor phase operating fluid, it is permissible to employ a differently structured heat pipe if this pipe satisfies such cooling characteristics.

Additionally, although the heat sink 11 has been designed as a refrigerant passage in which a heat exchange is performed with a refrigerant, it is permissible to fit a metallic block (not shown) having high thermal conduction into the recessed part 10A formed in the interior of the frame 10 and project the metallic block from the length in the longitudinal direction of the frame 10, thereby dissipating the heat to the open air.

Additionally, it is permissible to employ a structure in which the heat radiating part of the heat pipe 7 is provided with a heat radiating fin (not shown), and heat that has been transferred to the heat radiating fin is exchanged by passing a refrigerant (e.g., air) through the heat sink 11. This structure makes it possible to efficiently radiate the heat of the armature coil 6 and raise the thrust of the rotor without lowering a driving current.

Second Embodiment

Next, a second embodiment of the present invention will be described.

Figure 6:
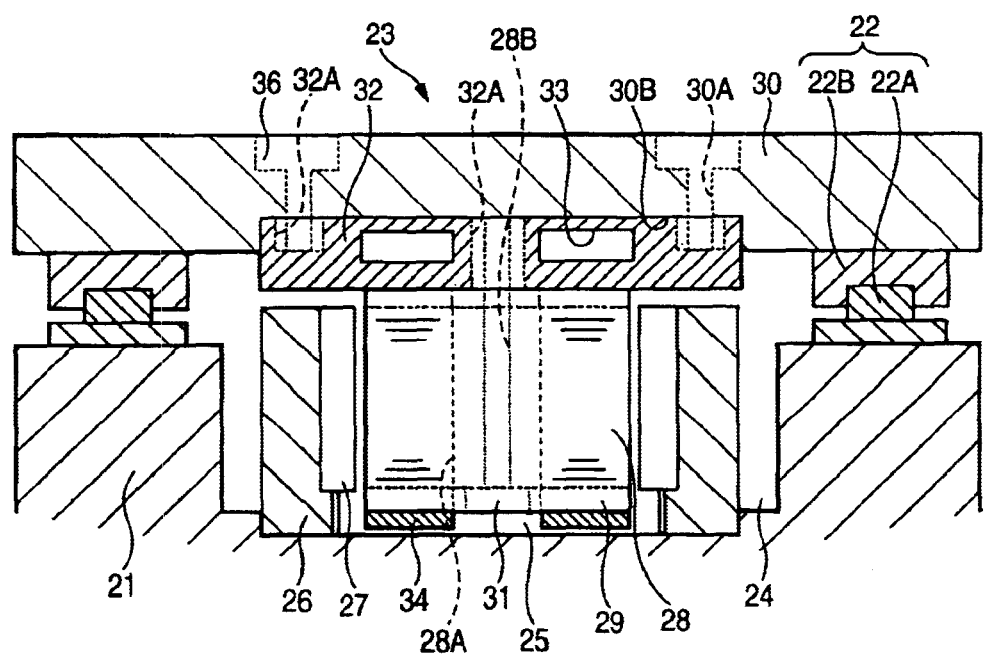
FIG. 6 shows a linear motor according to a second embodiment of the present invention, being a front sectional view along line A—A of FIG. 7.
Figure 7:
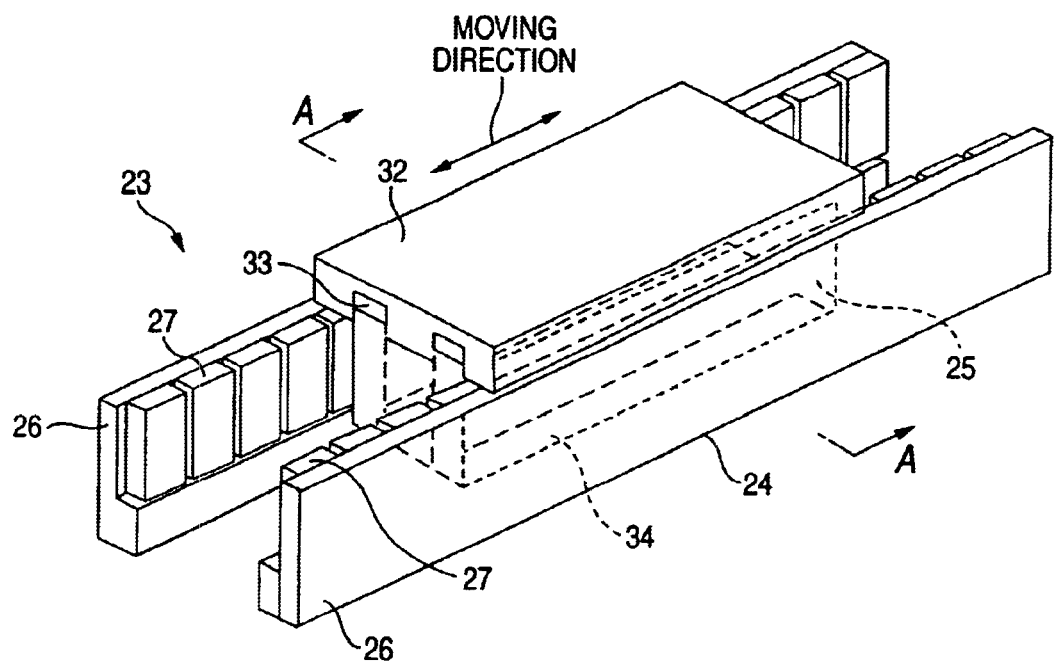
FIG. 7 is a general perspective view of the linear motor of FIG. 6, showing a state in which a table, a linear guide, and a fixed base have been detached.
Figure 8:
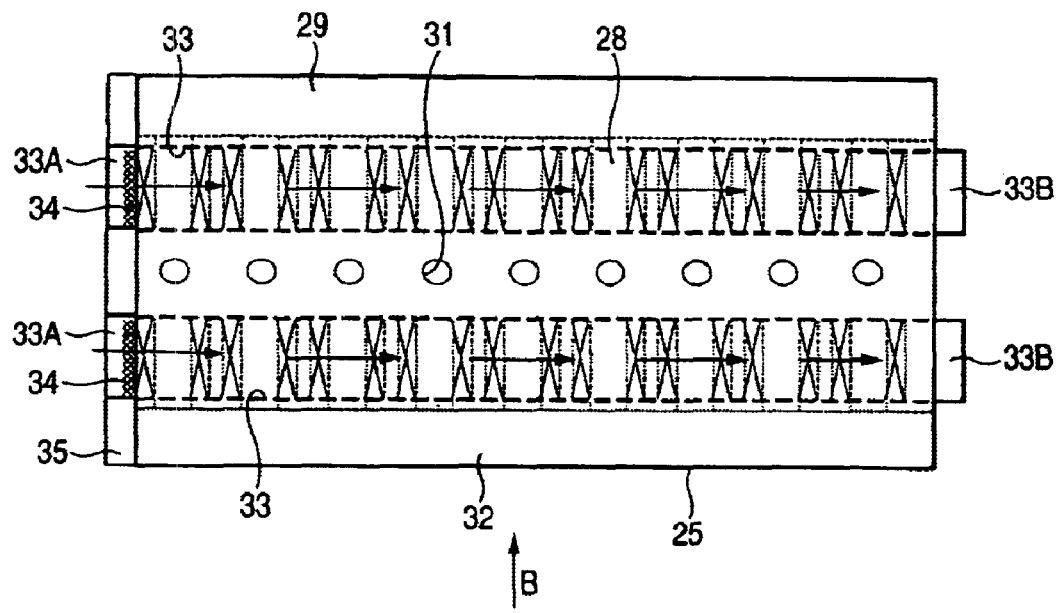
FIG. 8 is a plan see-through view seen from above a cooling unit and an armature of the linear motor of FIG. 7.
Figure 9:
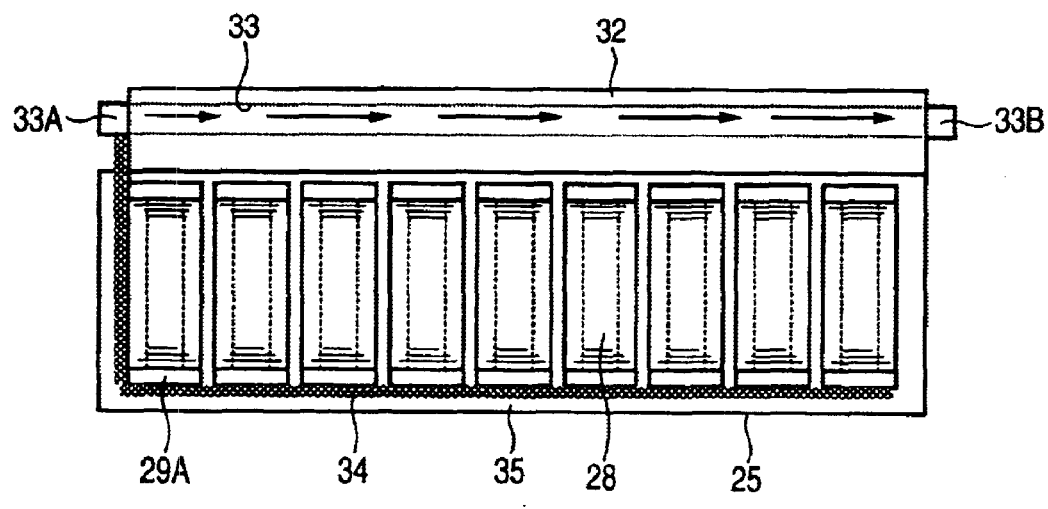
FIG. 9 is a side see-through view seen from arrow B of the cooling unit and an armature part of the linear motor of FIG. 8.

FIG. 6 is a front sectional view along line A—A of FIG. 7, showing a linear motor according to the second embodiment of the present invention. FIG. 7 is a general perspective view of the linear motor of FIG. 6, showing a state in which a table, a linear guide, and a fixed base have been detached. FIG. 8 is a plan see-through view seen from above a cooling unit and an armature of the linear motor of FIG. 7. FIG. 9 is a side see-through view seen from arrow B of the cooling unit and an armature part of the linear motor of FIG. 8. In the present invention, the same reference characters as in the conventional technique are given to the same constituent elements, and a description thereof are omitted. Only differences will be described.

In the figure, 32 is a cooling unit, 33 is a refrigerant passage, 33A is a refrigerant entrance, 33B is a refrigerant exit, 34 is a sheet-like heat pipe, and 35 is a resin mold.

The present invention is different from the conventional technique in the following respects.

One difference is the fact that the cooling unit 32 having the refrigerant passage 33 through which a refrigerant circulates is provided between the armature serving as a rotor 25 and the table 30. The refrigerant entrance 33A is disposed at an end of the cooling unit 32, and the refrigerant exit 33B is disposed at the other end thereof so that the refrigerant passage 33 causes the refrigerant to flow in the longitudinal direction of the cooling unit 32. Another difference is the fact that a fixing bolt 36 is passed through a through hole 30A made in the table 30 so that the cooling unit 32 can be freely detached from the table 30, and then a recessed part 30B of the table 30 is fixed by screwing the fixing bolt 36 into a female screw part 32A of the cooling unit 32. Still another difference is the fact that a fixing bolt 31 is passed through a through hole 28B of the core 28 so that the cooling unit 32 can be freely detached from the rotor 25, and then the rotor 25 is fixed by screwing the fixing bolt 31 into the female screw part 32A of the cooling unit 32.

The rotor 25 has a heat receiving part and a heat radiating part on a plane perpendicular to a plane facing the magnet array of the permanent magnets 27 serving as a stator with a magnetic air gap therebetween, and has a thin, bendable sheet-like heat pipe 34. As shown in FIG. 7 and FIG. 9, the sheet-like heat pipe 34 is bent substantially like an L, and the heat receiving part of the sheet-like heat pipe 34 is in contact with the surface of the armature, whereas a part of the heat radiating part is in contact with the cooling unit 32. The heat pipe can be mounted in all mounting directions without limiting the mounting direction of the heat receiving/radiating parts to a specific one.

Figure 10:
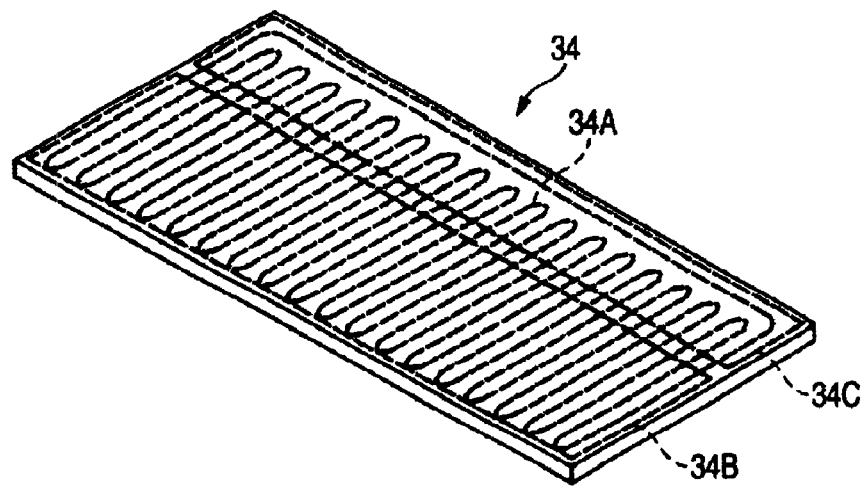
FIG. 10 is a general perspective see-through view of a sheet-like heat pipe.
Figure 11:
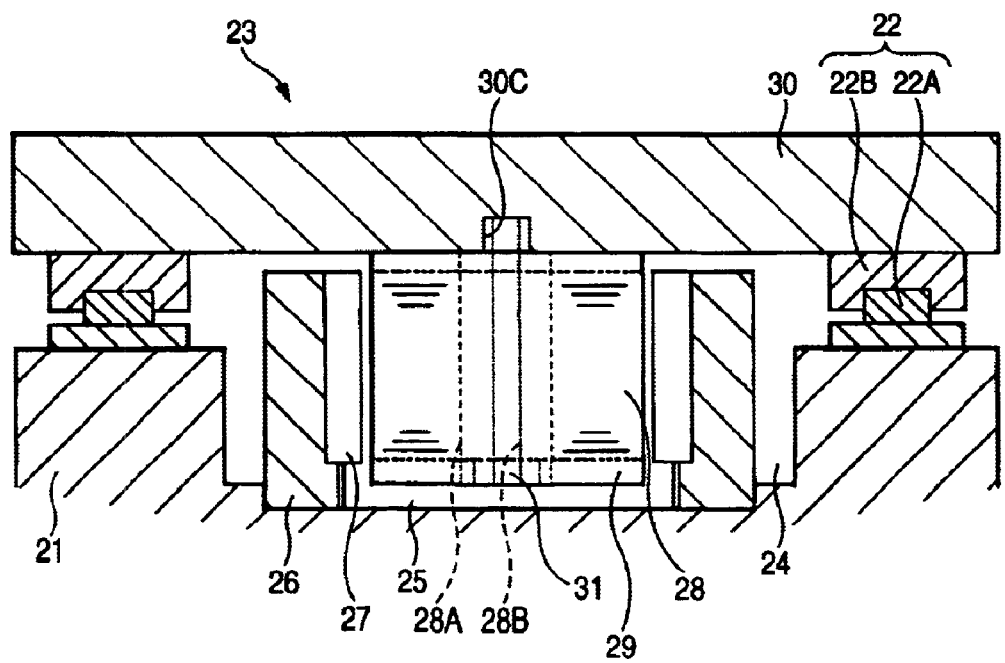
FIG. 11 is a front sectional view of the linear motor according to a second conventional technique.

Next, the internal structure of the sheet-like heat pipe 34 will be described in detail. FIG. 10 is a general perspective see-through view of the sheet-like heat pipe.

The sheet-like heat pipe 34 is constructed such that the hollow thin tube 34A meanders as if to make an array of tubes in the interior of a thin plate member made of metal superior in heat conduction. The thin tube 34A is filled with a two-phase operating fluid, such as chlorofluorocarbon, that consists of a liquid phase operating fluid and a vapor phase operating fluid. When the sheet-like heat pipe 34 is fixed to the armature, the heat receiving part 34B of the sheet-like heat pipe 34 of FIG. 10 is bent substantially like an L, and is disposed to cover the surface of the armature shown in FIG. 9, i.e., to cover the part exposed to the outside of the core 8 or a coil end 29A, and the heat pipe 34 and the armature are bonded together with a resin mold 35. At this time, in order to come in contact with the cooling unit 32, the heat radiating part 34C of the sheet-like heat pipe 34 should be disposed to jut out from the tip of the end face of the armature.

Next, the operation of the linear motor will be described.

In the structure formed as above, when a driving current is supplied to the coil 29 from a power source not shown, the rotor 25 generates a certain thrust, and the coil 29 generates heat because of internal resistance. The heat generated by the coil 29 is transferred to the heat receiving part 34B of the sheet-like heat pipe 34, and, when the heat receiving part 34B absorbs the heat, intense nucleate boiling occurs. Pressure waves changed into oscillatory waves by the intermission of the nucleate boiling cause the operating fluid, with which the meandering thin tube 34A is filled, to vibrate, and a large amount of heat is transferred to the heat radiating part 34C because of the vibrations of the operating fluid. The heat that has reached the heat radiating part 34C of the sheet-like heat pipe 34 is transferred to the refrigerant passage 34 formed in the interior of the cooling unit 32. The refrigerant supplied to the refrigerant entrance 33A of the refrigerant passage 33 flows toward the refrigerant exit 33B as shown by the arrow of the figure, and the heat generated by the armature part is removed by the refrigerant and is subjected to a heat exchange. As a result, the heat generated by the coil 29 is efficiently radiated by the cooling unit 32, and the temperature of the armature coil 29 is restrained from rising, and therefore the table 30 is prevented from receiving the heat and from undergoing thermal deformation without transferring the heat toward the table.

Therefore, the heat of the armature part generated, for example, when the rotor is moved with a high thrust can be efficiently removed by the sheet-like heat pipe 34 and the refrigerant passage 33, because the present invention has the structure in which the table 30 to mount a load is provided on the upper part of the armature serving as the rotor 25, the cooling unit 32 including the refrigerant passage 23 through which a refrigerant circulates is provided between the rotor 25 and the table 30, the armature is provided with the thin sheet-like heat pipe 34 on the plane perpendicular to the plane facing the magnet array of the permanent magnets 27 serving as the stator 24, and the heat receiving part 34B of the sheet-like heat pipe 34 is brought into contact with the surface of the armature, whereas the part of the heat radiating part 34C is brought into contact with the cooling unit 32. As a result, without transferring the heat generated by the armature part to the table 30, the armature part and the table 30 can be prevented from undergoing thermal deformation, and the core 28 can be prevented from warping in the longitudinal direction. Additionally, since the magnetic air gap between the coil 29 and the permanent magnets 27 does not vary, it is possible to provide a linear motor capable of preventing the occurrence of a cogging thrust and capable of performing positioning with high accuracy.

Additionally, since thermal deformation caused by the heat transfer to the table 30 does not occur, no influence is exerted on an error in the positioning accuracy of the linear guide 22 or a linear scale, and it is possible to provide a linear motor capable of performing highly-accurate positioning.

Additionally, since the coil 29 can be prevented from rising in temperature, the resin mold 35 covering the coil 29 can be prevented from being damaged because of thermal deformation, and gas is prevented from coming out from the surface of the resin mold 35, for example, even when the linear motor is used in a vacuum environment, thus making it possible to provide a linear motor with high reliability.

Additionally, according to the present invention, since the sheet-like heat pipe 34 is constructed such that the hollow thin tube 34A meanders as if to make an array of tubes in its interior, it is possible to have extremely-high thermal conductivity in spite of the fact that the structure is small in size, and it is possible to transfer heat swiftly.

Additionally, according to the present invention, since the sheet-like heat pipe 34 is bonded as one unit to the surface of the rotor 25 with the resin mold 35, the sheet-like heat pipe 34 can be easily fixed to the surface of the rotor 25.

Additionally, according to the present invention, since the cooling unit 32 is fixed by use of the fixing bolts 31 and 36 so that the unit can be freely removed from the rotor 25 or the table 30, assembly and disassembly can be easily performed between the rotor 25 and the table 30, and time and costs are reduced.

Although a description has been given of the magnetic-flux penetration type linear motor in which the permanent magnets are disposed on both sides of the coil in this embodiment, the present invention can be applied to a so-called gap-facing type linear motor in which the permanent magnets are disposed on one side of the coil in the same manner as in this embodiment.

INDUSTRIAL APPLICABILITY

As described above, the linear motor according to the present invention is useful for a system required to have ultraprecise positioning/high thrust, such as a conveyance system typified by that of tooling equipment or that of semiconductor-fabrication equipment.

What is claimed is:

1. A linear motor having a field yoke in which a plurality of permanent magnets with alternately different magnetic poles are disposed along the field yoke, an armature parallelly facing a magnet array of the permanent magnets with magnetic air gap between the armature and the magnet array, and a frame that fixes the armature and has a heat sink, wherein:
the permanent magnets and the field yoke that constitute the field poles are arranged in two-line form,
   the armature is disposed between the two-line filed poles and consists of at least two rows of armature coils formed by tabularly arranging a plurality of coil groups in longitudinal direction thereof,
   a tabular heat pipe is disposed between the plurality of coil rows along a longitudinal direction of the armature and is bonded with a resin mold so as to cover the coil rows, and
   the field poles and the armature are relatively run while using one of the filed poles and the armature as a stator and using the other one as a rotor, wherein:
   a part of a heat absorbing part of the heat pipe is fixed to the armature coil, whereas a heat radiating part thereof is inserted in an interior of the heat sink.

2. The linear motor as set forth in claim 1, wherein a block-shaped locking member to be fixed to the frame is provided between a part of the heat pipe to which the armature coil is fixed and a part thereof to be inserted into the interior of the heat sink.

3. The linear motor as set forth in claim 1 or 2, wherein the frame has a hollow recessed part that is a constituent element of the heat sink and is used to insert the heat radiating part of the heat pipe into an interior thereof, and a locking step part that is formed on a side of an opening of the recessed part and has a step designed so that it can be engaged with the locking member.

4. The linear motor as set forth in claim 1 or 2, wherein the heat sink is formed as a refrigerant passage in which a heat exchange is performed with a refrigerant.

5. The linear motor as set forth in claim 1 or 2, wherein the heat pipe has a hollow thin tube filled with an operating fluid bent parallelly in an interior of a thin plate member.

6. The linear motor as set forth in claim 1 or 2, wherein a material of the heat pipe is stainless steel.

7. A linear motor having a field pole in which a plurality of permanent magnets with alternately different magnetic poles are disposed along a field yoke, and an armature which faces the field pole with a magnetic air gap between the armature and the field pole and in which a plurality of coils are wound around a core having a slot, one of the field poles and the armature being used as a stator, the other one being used as a rotor, the rotor being relatively moved in a longitudinal direction of the stator, wherein:
   the rotor is provided with a table to mount a load, a cooling unit that has a refrigerant passage to circulate a refrigerant in its interior is provided between the rotor and the table,
   the rotor is provided with a thin sheet-like heat pipe on a plane in a direction perpendicular to a plane facing the stator with a magnetic air gap between the stator and the plane facing the stator, and
   a heat receiving part of the sheet-like heat pipe is brought into contact with a surface of the rotor, whereas a part of a heat radiating part is brought into contact with the cooling unit.

8. The linear motor as set forth in claim 7, wherein the sheet-like heat pipe has a structure in which a plurality of meandering hollow thin tubes are arranged.

9. The linear motor as set forth in claim 7 or 8, wherein the sheet-like heat pipe is bonded to a surface of the rotor with a resin mold.

10. The linear motor as set forth in claims 7 or 8, wherein the cooling unit is attached by use of a fixing bolt so that the cooling unit can be freely detached from the rotor or the table.

* * * * *